(12) United States Patent
Sakakibara et al.

(10) Patent No.: US 12,333,494 B2
(45) Date of Patent: Jun. 17, 2025

(54) INFORMATION PROCESSING DEVICE, INFORMATION PROCESSING METHOD, NON-TRANSITORY COMPUTER READABLE MEDIUM, AND INFORMATION PROCESSING SYSTEM

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Shizu Sakakibara, Kawasaki Kanagawa (JP); Hideyuki Aisu, Kawasaki Kanagawa (JP); Daiki Kiribuchi, Tokyo (JP); Takufumi Yoshida, Funabashi Chiba (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 644 days.

(21) Appl. No.: 17/689,551

(22) Filed: Mar. 8, 2022

(65) Prior Publication Data

US 2023/0085504 A1 Mar. 16, 2023

(30) Foreign Application Priority Data

Sep. 14, 2021 (JP) .................. 2021-149675

(51) Int. Cl.
*G06Q 10/0875* (2023.01)
*G06Q 30/0283* (2023.01)

(52) U.S. Cl.
CPC ..... *G06Q 10/0875* (2013.01); *G06Q 30/0283* (2013.01)

(58) Field of Classification Search
CPC ........................ G06Q 10/0875; G06Q 30/0283
See application file for complete search history.

(56) References Cited

U.S. PATENT DOCUMENTS

| 8,220,710 | B2 * | 7/2012 | Hoffman | G06Q 10/087 |
| | | | | 700/214 |
| 9,466,045 | B1 * | 10/2016 | Kumar | G06Q 10/087 |
| 9,965,730 | B2 * | 5/2018 | Hance | G06Q 10/087 |
| 10,994,931 | B2 * | 5/2021 | Zhu | B65G 1/1373 |
| 11,148,883 | B2 * | 10/2021 | Yoshitake | B65G 1/1373 |
| 11,182,743 | B2 * | 11/2021 | Li | G06Q 30/06 |
| 11,787,635 | B2 * | 10/2023 | Blotnik | B65G 1/1375 |
| | | | | 700/218 |
| 2019/0287063 | A1 * | 9/2019 | Skaaksrud | G06Q 10/0832 |

(Continued)

FOREIGN PATENT DOCUMENTS

| JP | 2010-100386 A | 5/2010 |
| JP | 2013-32227 A | 2/2013 |

(Continued)

*Primary Examiner* — Michael Jared Walker
(74) *Attorney, Agent, or Firm* — Finnegan, Henderson, Farabow, Garrett & Dunner, LLP (57) ABSTRACT

According to one embodiment, an information processing device includes a processor configured to determine items to be put on a plurality of first shelves which are capable of moving to a picking station, on a basis of distances between the plurality of first shelves and the picking station and order information of the items.

22 Claims, 9 Drawing Sheets

(56) References Cited

U.S. PATENT DOCUMENTS

| | | | | |
|---|---|---|---|---|
| 2021/0009352 A1* | 1/2021 | Jarvis | ............ | G05D 1/0225 |
| 2021/0245956 A1* | 8/2021 | Douglas | ............ | B65G 1/1375 |
| 2021/0264353 A1* | 8/2021 | Theobald | ............ | G06Q 10/087 |
| 2023/0004926 A1* | 1/2023 | Ikeda | ............ | G06Q 10/083 |
| 2023/0132794 A1* | 5/2023 | Li | ............ | G06Q 10/06316 |
| | | | | 705/29 |

FOREIGN PATENT DOCUMENTS

| | | | |
|---|---|---|---|
| JP | 5915400 | B2 | 5/2016 |
| JP | 2019-137543 | A | 8/2019 |
| JP | 2019-531990 | A | 11/2019 |
| JP | 2020-502014 | A | 1/2020 |
| JP | 2021-88452 | A | 6/2021 |

\* cited by examiner

| ORDER ID | ITEM ID (TYPE OF ITEM) | NUMBER | BOX ID | BATCH ID | |
|---|---|---|---|---|---|
| 1 | A | 10 | 1 | 1 | ⎫ |
| 2 | B | 3 | 1 | 1 | ⎪ |
| 3 | C | 5 | 1 | 1 | ⎬ BATCH 1 (ORDER AGGREGATE) |
| 4 | A | 2 | 2 | 1 | ⎪ |
| 5 | D | 3 | 2 | 1 | ⎪ |
| 6 | C | 24 | 3 | 1 | ⎭ |
| 7 | F | 3 | 10 | 2 | ⎫ |
| 8 | H | 7 | 11 | 2 | ⎬ BATCH 2 (ORDER AGGREGATE) |
| 9 | A | 12 | 11 | 2 | ⎭ |
| ⋮ | | | | | |

FIG. 6

| SHELF ID | ITEM ID (TYPE OF ITEM) | THE NUMBER OF ITEMS |
|---|---|---|
| 1 | A | 50 |
| 1 | B | 60 |
| 1 | C | 12 |
| 1 | D | 40 |
| 2 | A | 80 |
| 2 | C | 20 |
| 2 | F | 66 |
| 2 | H | 77 |
| 3 | A | 10 |
| . | | |
| . | | |
| . | | |

INFORMATION PROCESSING DEVICE, INFORMATION PROCESSING METHOD, NON-TRANSITORY COMPUTER READABLE MEDIUM, AND INFORMATION PROCESSING SYSTEM

CROSS REFERENCE TO RELATED APPLICATIONS

This application is based upon and claims the benefit of priority from the prior Japanese Patent Application No. 2021-149675, filed on Sep. 14, 2021, the entire contents of which are incorporated herein by reference.

FIELD

Embodiments of the present invention relate to an information processing device, an information processing method, a non-transitory computer readable medium, and an information processing system.

BACKGROUND

In a shelf movement type warehouse in which a plurality of movable shelves are provided, the shelves are moved to a picking station by vehicles, and workers pick up items from the shelves at the picking station. In terms of working hours for picking or load on workers, it is desired to put items at shelves so as to achieve efficient picking.

DETAILED DESCRIPTION

According to one embodiment, an information processing device includes a processor configured to determine items to be put on a plurality of first shelves which are capable of moving to a picking station, on a basis of distances between the plurality of first shelves and the picking station and order information of the items.

Embodiments of the present invention will be described below with reference to the drawings.

First Embodiment

Figure 1:
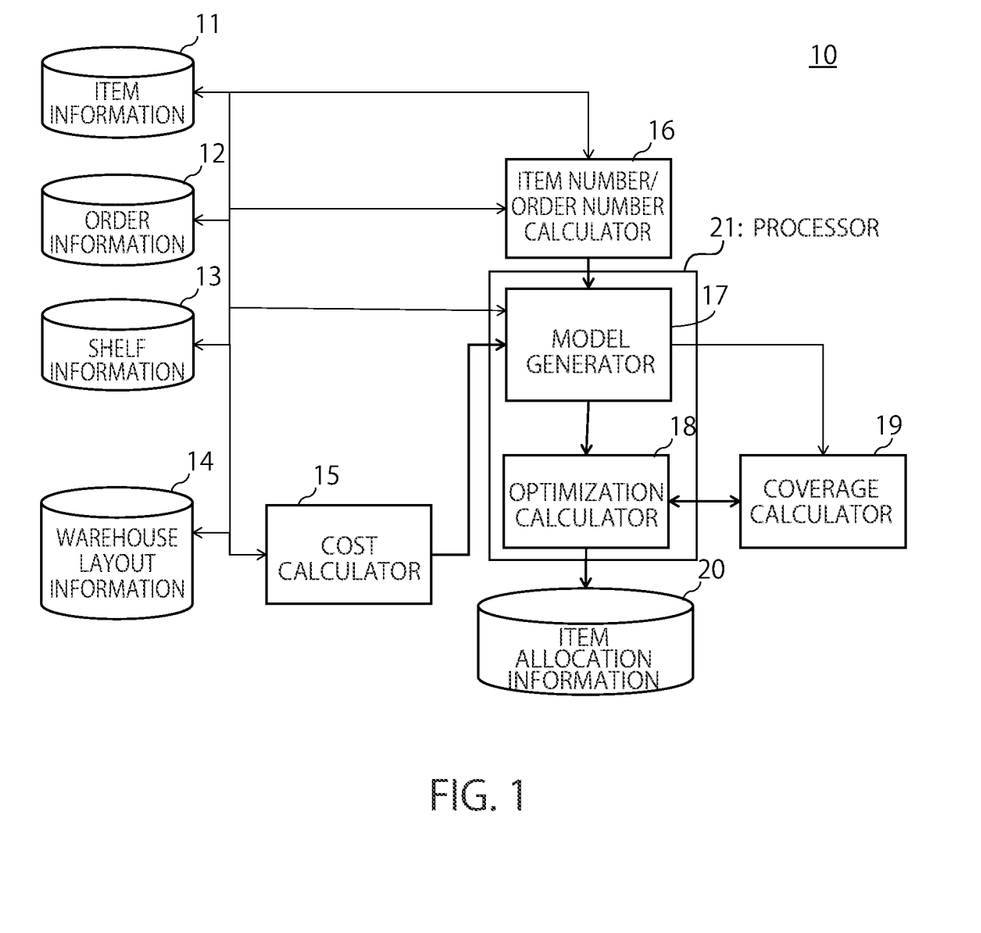
FIG. 1 is schematic block diagram of an item allocation device as an information processing device according to a first embodiment.

FIG. 1 is a schematic block diagram of an item allocation device 10 as an information processing device according to a first embodiment. The present device 10 is used for a shelf movement type warehouse. In the shelf movement type warehouse, a plurality of movable shelves (first shelves) are provided, and the shelves are moved to a picking station by moving devices (for example, AGVs). A worker at the picking station picks up items from the shelves and puts the items into a box for delivery. The present device 10 determines items to be put on respective shelves so as to achieve efficient picking of the items in the shelf movement type warehouse. There is a request to allocate items which are more frequently delivered to shelves closer to the picking station. Further, there is a request to pick up items for an aggregate of orders of items at the same time at the picking station (without additionally switching shelves at the picking station). The present embodiment can achieve at least one or both of these requests at the same time.

Figure 2:
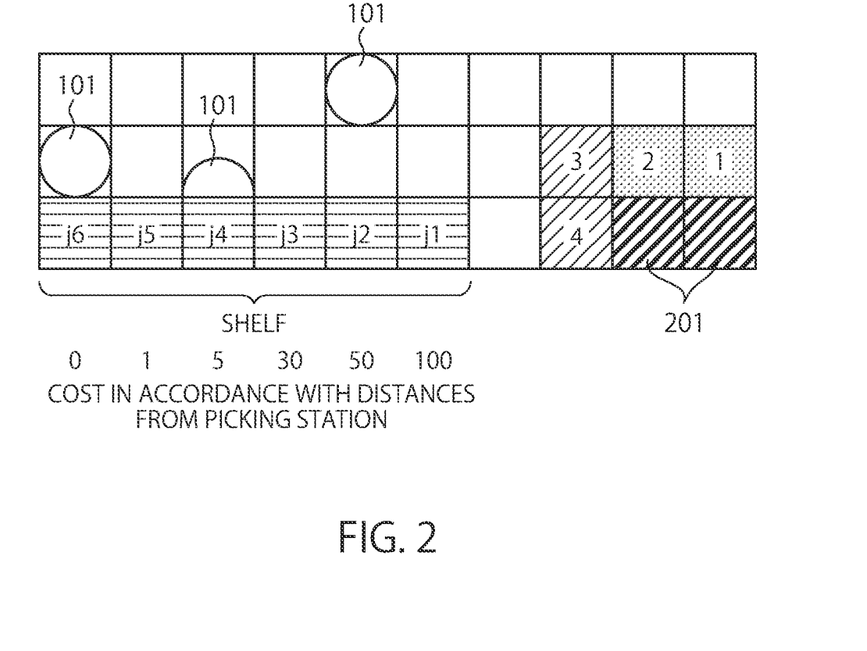
FIG. 2 is a plan view schematically illustrating a shelf movement type warehouse.

FIG. 2 is a plan view schematically illustrating a shelf movement type warehouse. In the warehouse, a plurality of shelves "j1" to "j6" are provided. An arbitrary shelf is expressed as a shelf "j". In the warehouse, a picking station 201 where a worker picks up items from shelves is provided. The shelves "j1" to "j6" can be moved (conveyed) by the respective moving devices 101 which can move on movement paths in the warehouse. The moving device 101 is, for example, a vehicle such as an automatic guided vehicle (AGV). The moving device 101 may be either an autonomous mobile vehicle or a vehicle which moves in accordance with a path instructed from outside. The moving device 101 conveys a designated shelf to a designated location (for example, the picking station 201) in response to an instruction signal from an external control device (not illustrated). Waiting positions 1, 2, 3 and 4 are provided adjacent to the picking station 201. One shelf can be disposed at each of the waiting positions 1 to 4. The worker can pick up items both from the shelves disposed at the waiting positions 1 and 2. In other words, the worker can pick up items from a plurality of shelves at the same time.

The waiting positions 3 and 4 are positions where shelves wait before the shelves are moved to the waiting positions 1 and 2. The worker does not pick up items from the shelves disposed at the waiting positions 3 and 4. Providing the waiting positions 3 and 4 enables shelves from which items are to be picked up next to be quickly moved to the waiting position 1 or 2. However, it is also possible to employ a configuration where the waiting positions 3 and 4 are not provided.

The respective shelves are sequentially moved to the waiting positions 4, 3, 2 and 1 in this order.

Figure 3:
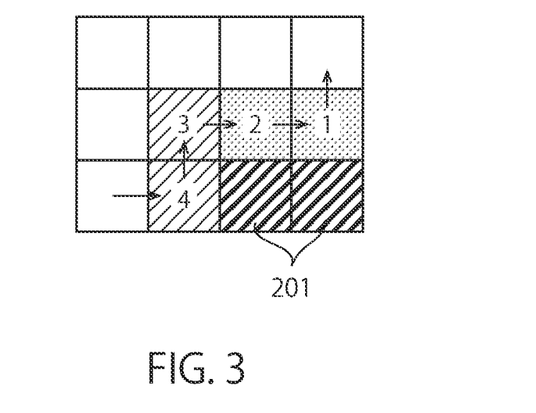
FIG. 3 is a view for explaining sequential movement of respective shelves to waiting positions.

FIG. 3 is a view for explaining sequential movement of the respective shelves to the positions 4, 3, 2 and 1 in this order. In a case where picking up items from the shelf is finished at the waiting position 1, the shelf is conveyed out from the waiting position 1 by the moving device 101. Thereafter, the shelves at the waiting positions 2, 3 and 4 are respectively moved to the waiting positions 1, 2 and 3 by the moving devices 101, and a new shelf is conveyed into the waiting position 4 by the moving device 101. In a case where picking up items from the shelves is finished at the waiting positions 1 and 2, the shelf is conveyed out from the waiting position 1, and the shelf is conveyed out from the waiting position 2 through the waiting position 1. The shelves at the waiting positions 3 and 4 are respectively moved to the waiting positions 1 and 2, and new shelves are respectively conveyed into the waiting positions 3 and 4.

Figure 4:
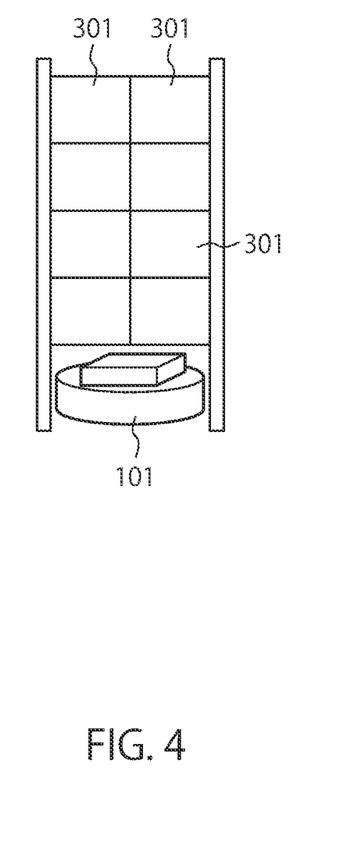
FIG. 4 is a perspective view schematically illustrating an example of a shelf and a moving device.

FIG. 4 is a perspective view schematically illustrating examples of the shelf and the moving device. FIG. 4 illustrates the shelf "j" viewed from the front. A plurality of compartments 301 are provided at the shelf "j". One or a plurality of items can be put into each compartment 301. The moving device 101 can get into space between legs of the shelf "j" and has a mechanism of lifting the shelf between the legs. The moving device 101 can move in the warehouse while lifting the shelf. However, the moving device 101 may convey the shelf using other methods. For example, the moving device 101 may dock with the shelf from side surfaces and may tow the shelf. While in the present embodiment, the moving device exists independently of the shelf, the moving device may be integrally incorporated into the shelf itself.

Figure 5:
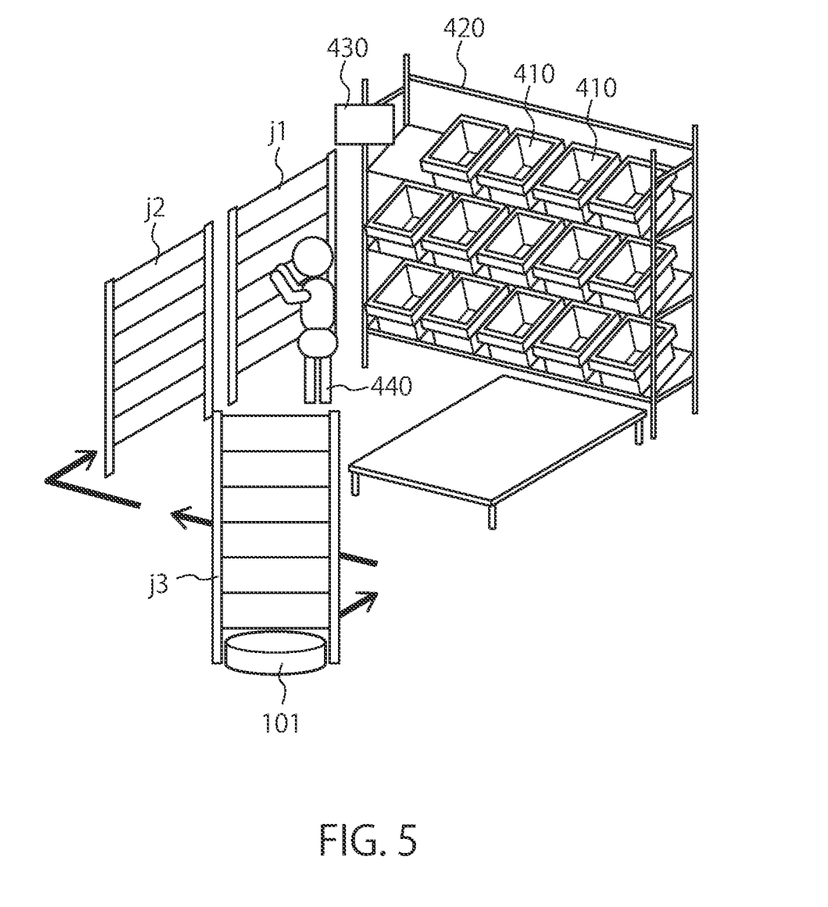
FIG. 5 is a view illustrating aspect where a worker picks up items at a picking station.

FIG. 5 schematically illustrates aspect where a worker picks up items at the picking station. At the picking station, a plurality of boxes 410 into which items are to be put are placed at a rack 420. FIG. 5 illustrates aspect where a worker 440 takes out items from two shelves "j1" and "j2" disposed at the waiting positions 1 and 2 and puts the items into a box 410 corresponding to order data on the basis of a plurality of pieces of order data displayed at a work monitor 430. The worker 440 may be either a human worker or a robot worker. In the present example, it is assumed that the worker 440 is a human worker. One piece of order data describes orders of one or more items regarding one type of item. Further, one box (destination) corresponds to one or a plurality of pieces of order data. In the present embodiment, one piece of order data includes only one type of item, and in a case where a certain customer (the same destination) orders a plurality of types of items, there exists order data for each type of item. However, the present invention can be also applied to a case where one piece of order data includes a plurality of types of items.

The order data includes information on a shelf and a compartment from which items are to be taken out, the number of items to be taken out, and a box into which items are to be put. The worker can recognize a shelf and a compartment from which items are to be taken out, the number of items to be taken out, and a box into which the items are to be put in accordance with an instruction of the order data displayed at the work monitor 430.

In a case where an item described in one piece of order data does not exist at any of two shelves at the picking station, it is necessary to convey out the shelves and move another shelf to the picking station (the waiting position 1 or 2) to complete processing of the order data. Note that it is assumed in the present embodiment that a movement plan as to order of movement of shelves upon actual picking is created on the basis of order data which is actually generated. However, the worker or a manager may instruct a control device (not illustrated) that controls the moving device of a shelf which is to be moved through manual operation by referring to information as to which type of item and how many items are put on which shelf. In the present embodiment, attention is focused on determination as to which item is to be put on each shelf, and a movement plan as to how the shelf is moved in a case where actual order data is generated will not be described in detail in the present embodiment.

While in the example in FIG. 5, the worker (human) picks up items at the picking station, a picking robot may pick up items and put the items into a box. In this case, the picking robot receives instruction data which gives an instruction regarding a shelf and a compartment from which items are to be taken out, the number of items to be taken out and a box into which the items are to be put by a robot control device which is not illustrated and picks up items and puts the items into a box on the basis of the instruction data.

Frequent movement of shelves leads to degradation of efficiency in terms of time, work efficiency or power consumption of shelves. It is efficient if items in more pieces of order data can be picked up from shelves at the waiting positions 1 and 2 at one time. Further, also in a case where it is necessary to move shelves, it is efficient to move a shelf closer to the picking station. In the present embodiment, by determining items to be put on the respective shelves while taking into account a possibility of picking up items at the same time and a conveyance distance, it is possible to satisfy these requirements at the same time.

The item allocation device 10 in FIG. 1 includes an item information storage 11, an order information storage 12, a shelf information storage 13, a warehouse layout information storage 14, an item number/order number calculator 15, a cost calculator 16, a processor 21 (a model generator 17, an optimization calculator 18), a coverage calculator 19 and an item allocation information storage 20.

The item information storage 11 stores at least information on an item ID, the number of items which can be put into each compartment of each shelf "j", a total number or a maximum value of items which can be put on the shelf "j". In a case where there is no constraint in the number of items which can be put into a compartment, a total number may be set as infinity. The number of items which can be put into a compartment may be calculated from a size of an item in length, width and height and a size of a compartment in length, width and height. It is assumed in the present embodiment that no item is put into each compartment of each shelf at the beginning.

The order information storage 12 stores information (order information) at least including an order ID (order number), an item ID (type of item), the number of items, a destination ID, a box ID and a batch ID.

Figure 6:
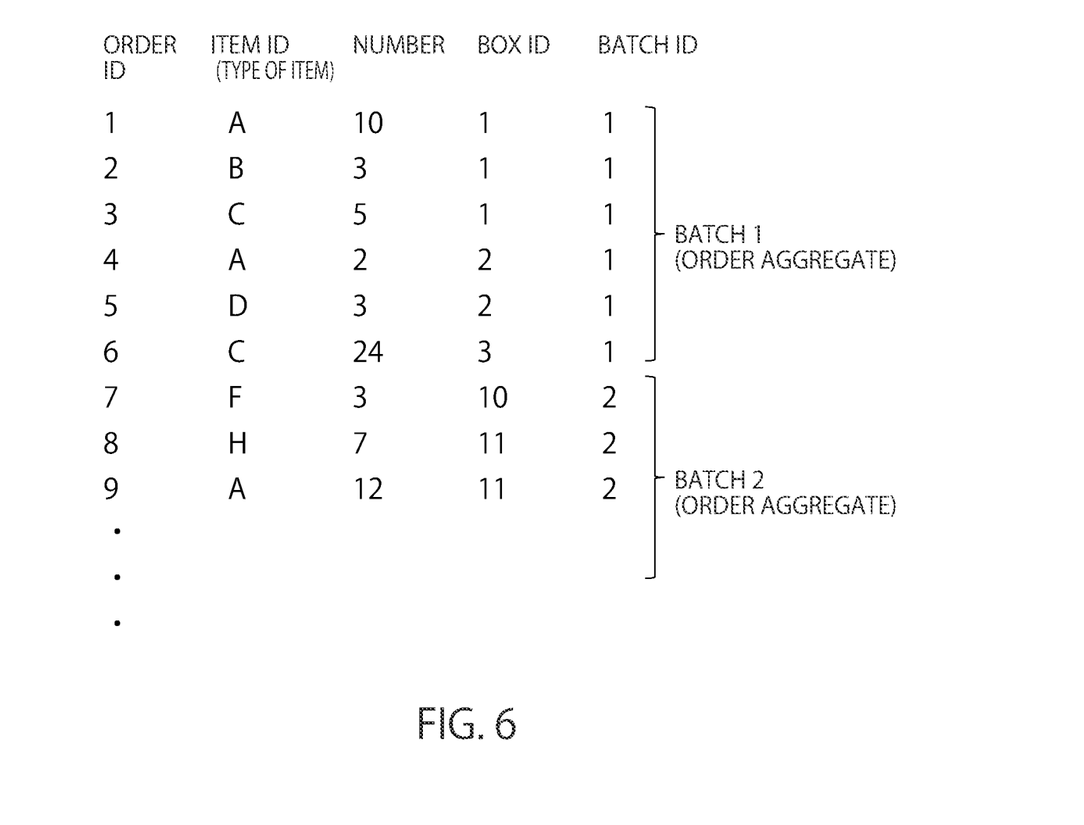
FIG. 6 is a view illustrating an example of order information in an order information storage.

FIG. 6 illustrates an example of the order information at the order information storage 12. There is a case where even if destinations of items are the same, the items are packed into different boxes, and thus, the box ID is distinguished from the destination ID. The batch ID will be described later.

The order information in the order information storage 12 is order information virtually created for determining allocation of items to respective shelves. The order information may be history of order information actually generated in the past. Further, orders to be generated in the future from customers, consumers, or the like, may be predicted, and information on the predicted orders may be used. In a case where there is much time until shipment from when orders are received from customers, the order information may be orders actually received from the customers, the consumers, or the like. The order information may be created using other methods.

A plurality of pieces of order information in the order information storage 12 are divided into a plurality of pieces (batches) in unit of the number of orders which can be picked up at the same time at the picking station. By the order information being divided into a plurality of batches, one or more order aggregates (batches or sets) which can be picked up at the same time are generated. Each order aggregate will be referred to as a batch. A batch ID (see FIG. 6) is allocated to the batch.

The number of pieces of order information included in one batch (order aggregate) may be, as an example, the same as the number of boxes 410 which can be placed on the rack 420 of the picking station or may be smaller than the number of boxes 410. In a case where a plurality of pieces of order information are associated with the same box ID, pieces of order information equal to or more than the number of boxes 410 which can be placed on the rack 420 of the picking station can be made a target of picking at the same time. However, the number of pieces of order information to be included in one batch is determined while taking into account a case where destinations of the order information in the batch are all different. Note that a method of batch is not limited to a particular method. For example, the order information may be separated for each given number of pieces in order of the order number, or order information which is likely to be processed at the same time (for example, order information with the same box ID or order information with the same destination ID) may be included in one batch. Other methods may be used. While in the present embodiment, each batch has the same number of elements (the same number of pieces of order information), the present invention is not limited to this.

The shelf information storage 13 includes at least a shelf ID and an aggregate of compartment (frontage) IDs included in the shelf. Note that part of the information stored in the item information storage 11 may be stored in the shelf information storage 13. For example, information on a total number or a maximum value of the number of items which can be put into a compartment of a compartment ID may be stored in the shelf information storage 13 for each item ID.

The warehouse layout information storage 14 includes information on a position of the picking station in the warehouse, information on a position of each shelf "j". The position of each shelf "j" is a location where each shelf "j" is currently disposed. The information on the position of the shelf may be updated after the shelf "j" is moved by the moving device.

The warehouse layout information storage 14 may store information on a period or a distance (conveyance distance) required for moving each shelf "j" from the position of the shelf "j" to the picking station. It is assumed in the present embodiment that the shelves "j1" to "j6" are disposed at positions in FIG. 2 at the beginning. Note that a shelf from which items have been picked up at the picking station may be returned to an original position or may be returned to another position. A method for determining a position to which a shelf is returned will not be described in detail in the present embodiment.

A position of the shelf may be grasped using any method. For example, the present device 10 or a control device that instructs the moving device 101 to convey the shelf may specify a position of the shelf by tracing back history of instructions given by the control device to the moving device 101. Alternatively, in a case where a shelf can autonomously move, the moving device provided at the shelf may calculate a position of the own device through SLAM, or the like, and may transmit information of the calculated position to the present device 10. Alternatively, communication devices may be respectively provided at the shelf and the present device 10, and the present device 10 may grasp the position of the shelf by performing communication with the shelf to receive an ID of the shelf and analyzing an image (a shelf ID is attached to the shelf using a seal, printing, or the like) captured with a camera inside the warehouse.

The item number/order number calculator 15 obtains information from the item information storage 11, the order information storage 12 and the shelf information storage 13 and calculates (a) the number of each item included in an order aggregate, (b) the number of pieces of order information including each item in the order aggregate (hereinafter, also referred to as the number of orders), and (c) the number of each item which can be put on each shelf (which may be the number for each frontage). Information on (a) to (c) is calculated for each order aggregate.

The cost calculator 16 obtains information from the shelf information storage 13 and the warehouse layout information storage 14 and calculates cost required for moving each shelf "j" to the picking station (shelf cost or movement cost).

A value of the cost becomes smaller as a distance (conveyance distance) between a shelf and the picking station is longer. For example, a value obtained by multiplying a constant by an inverse of a distance is set as the cost. A value obtained by discretizing an inverse of a distance may be set as the cost. A distance between the shelf and the picking station is, for example, a linear distance, a shortest path distance, an average value of traveling time in the past data, or the like. Concerning a distance between the shelf and the picking station, in a case where the shelf requires to arrive at the waiting position 4 first as described above, a distance between the shelf and the waiting position 4 may be set as the distance between the shelf and the picking station. FIG. 2 described above illustrates an example of cost of the shelves "j1" to "j6". The cost is higher as the shelves are closer to the picking station.

The coverage calculator 19 calculates a coverage for each shelf "j" for a plurality of batches (order aggregates). The coverage is a ratio of order information included in the batch (order aggregate) or items included in the order aggregate being covered (picked up at the same time) by items to be put on the shelf. A calculation example of the coverage is indicated below.

Coverage Calculation Example 1

The coverage calculator 19 counts the number of pieces of order information including items in a case where a total number of items in the batch is equal to or larger than a total number of the items to be put on the shelf (there may be a plurality of pieces of order information of the same item). The coverage calculator 19 sets a ratio of a sum of count values of order information for each item and a total number of pieces of order information in the batch as a coverage of the shelf for the batch.

Coverage Calculation Example 2

The coverage calculator 19 calculates the number of pieces of order information for which the number of items in order information in a batch is equal to or larger than the number of the items to be put on the shelf. The coverage calculator 19 sets a ratio of the calculated number of pieces of order information and a total number of pieces of order information in the batch as a coverage of the shelf for the batch.

Coverage Calculation Example 3

In a case where the number of items in a batch is equal to or larger than the number of the items to be put on the shelf, the coverage calculator 19 sums the number of the items. The coverage calculator 19 sets a ratio of a sum of total values for each item and the number of all items to be put on the shelf as the coverage.

The above-described coverage calculation examples are examples, and calculation examples 1 to 3 may be combined, or calculation examples 1 to 3 can be modified in various manners. Further, the coverage may be calculated using other methods.

The processor 21 determines items to be put on a plurality of shelves on the basis of cost of the respective shelves and a plurality of batches. The processor 21 includes a model generator 17 and an optimization calculator 18.

The model generator 17 formulates a model indicated in expression (1) on the basis of the information (a) to (c) calculated at the item number/order number calculator 15, the cost of the respective shelves calculated at the cost calculator 16, and the information stored in the item information storage 11, the order information storage 12 and the shelf information storage 13.

The model in expression (1) is a model representing a sum of multiplication values of a minimum coverage "$y_j$" and cost "$a_j$". Coverages for the shelf "j" are calculated for each of a plurality of batches, and a minimum value among the coverages for each batch is set as a coverage "$y_j$" (see expression (8)). The optimization calculator 18 which will be described later determines values of unknown variables ("$x_{i,j}$", "$y_j$", "$w_{j,k,i}$") by setting the model in expression (1) as an objective function and maximizing an index which is a value of the objective function. Note that the following model can be applied regardless of the number of waiting positions (in the above-described example, two positions of the waiting positions 1 and 2) where items can be picked up at the same time at the picking station.

[Expression 1]

$$\max.: \Sigma_{j \in J}(a_j y_j), \quad (1)$$

$$y_j = f(j), (j \in J) \quad (2),$$

$$\Sigma_{i \in I} x_{i,j} \leq L, (j \in J) \quad (3),$$

$$\Sigma_{j \in J} q_i x_{i,j} \leq r_i, (i \in I) \quad (4),$$

$$0 \leq w_{j,k,i} \leq 1, (j \in J, k \in K, i \in I) \quad (5),$$

$$x_{i,j} \in \{0,1,\ldots\}, (i \in I, j \in J) \quad (6),$$

$$w_{j,k,i} \in \mathcal{R} \ (j \in J, k \in K, i \in I) \quad (7).$$

I: aggregate of types of items
J: shelf aggregate
O: the number of orders in a batch
K: aggregate of batches
$O_{k,i}$: the number of items "i" included in all orders of a batch "k"
$a_j$: cost in accordance with a distance of a shelf "j" from the picking station
$p_{k,i}$: how many orders of the item "i" are included in the batch "k"
$q_i$: a maximum number of items "i" which can be included in one frontage of a shelf
$r_i$: a maximum value of the number of items "i" which can be put
L: the number of frontages of a shelf
$x_{i,j} \in \{0, 1, \ldots\}$: items "i" corresponding to "$x_{i,j}$" frontages are put on the shelf "j". "$x_{i,j}$" is an integer.
$y_j$: a minimum coverage of the shelf "j" (minimum value of the coverage for each batch)
$w_{j,k,i}$: intermediate variable
$y_j = f(j)$ indicated in (2) is a minimum coverage calculated by the coverage calculator. (3) to (5) are constraint conditions. (6) and (7) are definition of "x" and "w". While "$r_i$" (a maximum value of the number of items "i" which can be put) is a value common to all the shelves in the present example, different values may be defined for each shelf.

The coverage calculator 19 calculates a minimum value of the coverage (minimum coverage) for each batch for each shelf "j". The minimum coverage of the shelf "j" is calculated with a function indicated in the following expression (8). The coverage for each batch for the shelf "j" is mainly based on the above-described coverage calculation example 1. (9) and (10) are constraint conditions of "$w_{j,k,i}$".

[Expression 2]

$$f(j) = \min_{k \in K} \frac{\sum_{k \in I} p_{k,i} w_{j,k,i}}{O}, (j \in J), \quad (8)$$

$$\sum_{d \in \{1..(j-1)\}} w_{d,e,f} + \frac{q_i x_{i,j}}{o_{k,i}} \geq w_{j,k,i}, (j \in J, k \in K, i \in I), \quad (9)$$

$$0 \leq w_{j,k,i} \leq 1, (j \in J, k \in K, i \in I), \quad (10)$$

"$w_{j,k,i}$" falls within a range between 0 and 1 and is equal to or less than a value in a left side of expression (9). As an example, "$w_{j,k,i}$" may fall within a range between 0 and 1 and may be a maximum value which satisfies expression (9) (equal to the value in the left side).

A first term (term including E) in the left side of expression (9) is a sum of "w" (to distinguish from "$w_{j,k,i}$", set as "$w_{d,e,f}$". "d" is a symbol having the same meaning as "j", "e" is a symbol having the same meaning as "k", and "f" is a symbol having the same meaning as "i") calculated at the shelves ("j"=1, . . . , j−1) processed before the shelf "j" which is to be processed. Thus, in a case of a shelf which is to be processed first, the first term in the left side of expression (9) is 0.

Concerning a second term in the left side of expression (9), in a case where "$q_i \cdot x_{i,j}$" items are put on the shelf "j" to be processed, if the number of items is equal to or larger than the number of items "i" included in all orders of the batch "k", a value of the second term becomes equal to or greater than 1. In this case, in a case where the shelf "j" to be processed is a shelf to be processed first, "$w_{j,k,i}$" is 1, and items are 100% covered at the shelf "j" for orders of the items "i". In a case where items are 100% covered for orders of other items "i" of the batch "k" in a similar manner, a right side $$\frac{\sum_{k \in I} p_{k,i} w_{j,k,i}}{O}$$

of expression (8) becomes 1 (the coverage for the batch "k" of the shelf "j" becomes 100%). Concerning shelves to be processed second and thereafter, "$w_{j,k,i}$" is determined while a sum of "$w_{d,e,f}$" calculated for the shelves processed before is also taken into account. In other words, even if items "i" are not 100% covered at the shelf "j" which is currently being processed, a value of "$w_{i,j,k}$" becomes greater by an amount corresponding to the sum of "$w_{d,e,f}$" calculated at the shelves "j" ("j"=1, . . . , j) processed before. In other words, a value of "$w_{i,j,k}$" becomes greater by an amount corresponding to the items covered at the shelves before. As a modification of expression (9), the first term (term including E) in the left side of expression (9) can be removed.

As a modification of the coverage, a plurality of coverages may be multiplied by weights "α", "β", and multiplication results may be added as in the following expression (11).

[Expression 3]

$$f(j) = \alpha \min_{k \in K} \frac{\sum_{k \in I} p_{k,i} w_{j,k,i}}{O} + \beta \min_{k \in K} \frac{\sum_{k \in I} p_{k,i} h_{j,k,i}}{O}, (j \in J), \quad (11)$$

$$\sum_{d \in \{1 .. (j-1)\}} w_{d,e,f} + \frac{q_i \cdot x_{i,j}}{o_{k,i}} \geq w_{j,k,i}, (j \in J, k \in K, i \in I), \quad (12)$$

$$0 \leq w_{j,k,i} \leq 1, (j \in J, k \in K, i \in I), \quad (13)$$

$$\frac{q_i \cdot x_{i,j}}{o_{k,i}} \geq h_{j,k,i}, (j \in J, k \in K, i \in I), \quad (14)$$

$$h_{j,k,i} \in \{0, 1\}, (j \in J, k \in K, i \in I). \quad (15)$$

While "$w_{j,k,i}$" is a value falling within a range between 0 and 1, "$h_{j,k,i}$" is a binary variable of 0 or 1. In a case where "$q_i \cdot x_{i,j}$" items are put on the shelf "j" to be processed, if the number of items is equal to or larger than the number of items "i" included in all orders of the batch "k", "$h_{j,k,i}$" is 1. In other words, items are (100%) covered at the shelf "j" for orders of the items "i". In a case where "$q_i \cdot x_{i,j}$" items are put on the shelf "j" to be processed, if the number of items is less than the number of items "i" included in all orders of the batch "k", "$h_{j,k,i}$" is 0. In other words, items are not 100% covered at the shelf "j" for orders of the items "i". It is only necessary to make the weight "β" greater as more importance is given to the coverage at the shelf "j" to be processed than the shelves processed before.

Constraint may be provided to relationship between "α" and "β". For example, constraint that an addition value of "α" and "β" is 1 may be provided.

The optimization calculator 18 searches for a solution by maximizing or semi-maximizing (optimizing or semi-optimizing) an objective function of the model generated at the model generator 17 using the coverage calculator 19. Various methods are known as the optimization method. For example, examples of the optimization method include a rule-based solution construction method (greedy algorithm, a local search method), genetic algorithm (GA), simulated annealing (SA) and enumeration-based search. Further, examples of the optimization method include a method in which a model is formulated to mixed-integer linear programming to obtain a solution using a general-purpose solver, an optimization method through quantum annealing, an optimization method using ising machine, or the like.

The item allocation information storage 20 stores information on allocation of respective items to respective shelves (item allocation information) calculated by the optimization calculator 18.

Figure 7:
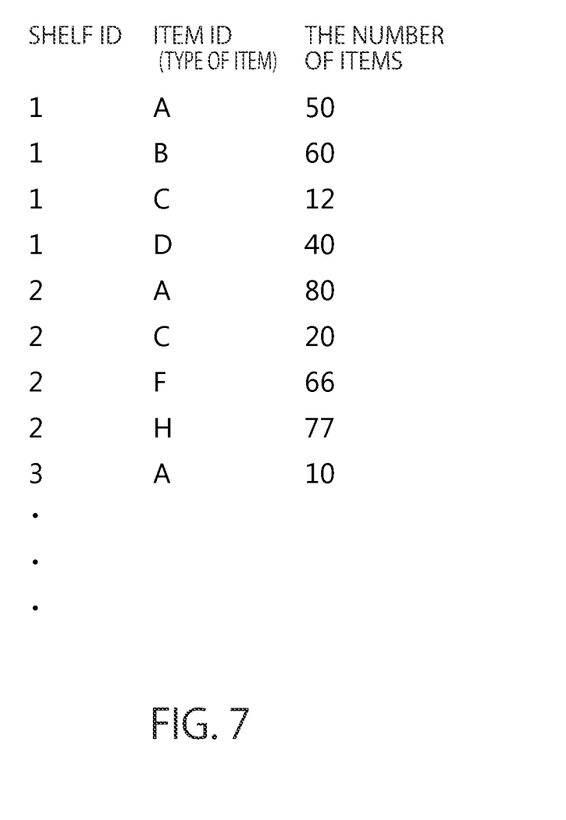
FIG. 7 is a view illustrating an example of item allocation information.

FIG. 7 illustrates an example of the item allocation information. The item allocation information includes information on a shelf ID, an item ID and the number of items. While the optimization calculator 18 calculates the number of compartments into which items are to be put as a solution of the objective function, in FIG. 7, the number of compartments is converted into the number of items on the basis of a maximum value of the number of items which can be put into a compartment. The number of compartments may be added in place of or in addition to the number of items in FIG. 7. The minimum coverage "$y_j$" (see expression (2)) of the shelf calculated at the optimization calculator 18 may be added to the item allocation information.

The present device 10 may transmit the item allocation information in FIG. 7 to a placement control device that controls placement of items at the respective shelves, and the placement control device may cause a robot that places items to convey the items from a storage location to the respective shelves to put the items on the shelves. The robot may be the moving device 101 in FIG. 2 or may be other dedicated devices for placement. Further, the worker can put items on respective shelves with reference to the item allocation information.

Figure 8:
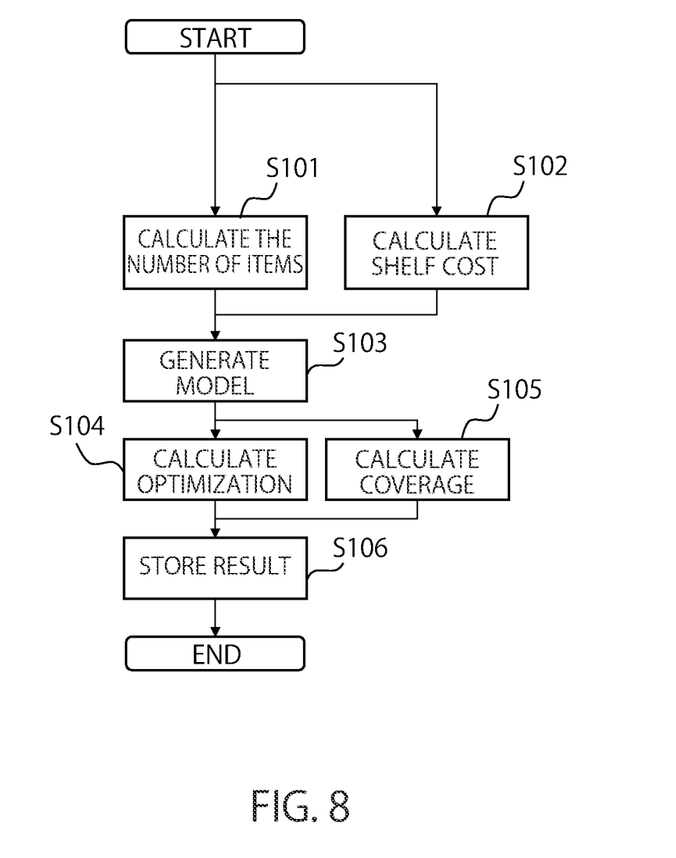
FIG. 8 is a flowchart illustrating an example of operation of the item allocation device according to the first embodiment.

FIG. 8 is a flowchart illustrating an example of operation of the item allocation device 10 according to the first embodiment. The item number/order number calculator 15 obtains information from the item information storage 11, the order information storage 12 and the shelf information storage 13 to calculate the above-described information (a) to (c) for each order aggregate (step S101).

The cost calculator 16 obtains information from the shelf information storage 13 and the warehouse layout information storage 14 to calculate cost (shelf cost or movement cost) required for moving each shelf "j" to the picking station (step S102).

The model generator 17 generates a model representing a sum of multiplication values of the minimum coverage "$y_j$" and the cost "$a_j$" on the basis of the information (a) to (c), the shelf cost of the respective shelves and the information stored in the item information storage 11, the order information storage 12 and the shelf information storage 13 (step S103).

The optimization calculator 18 determines a variable of the model by optimizing or semi-optimizing the objective function based on the model (step S104). In process of the optimization processing, the optimization calculator 18 calculates coverages of the respective shelves using the coverage calculator 19 (step S105).

As described above, according to the present embodiment, by determining allocation of items to the respective shelves on the basis of the coverages of the respective shelves and the cost of the respective shelves, a possibility that items can be picked up at the same time for a plurality of orders increases when items are picked up on the basis of actually generated orders of items, so that picking efficiency improves. Further, a conveyance distance or a conveyance period of a shelf from which items are to be picked up can be shortened when the shelf is moved, so that it is efficient also in terms of time and load (such as energy consumption) on the moving device.

Second Embodiment

In a case where there are a plurality of shelves, the shelves may be divided (grouped) into classes to generate a plurality of classes (shelf groups). Cost for each class is calculated, and a coverage for each class is calculated. It is only necessary to use a representative value of cost of a plurality of shelves belonging to the class as the cost for each class. The representative value is, for example, an average, a maximum value, a minimum value, a median value, or the like. By the symbol "j" representing a class in place of a shelf in the model described in the first embodiment, processing similar to the processing in the first embodiment can be performed. By the shelves being divided into classes in this manner, the number of targets to be processed is reduced, so that it is possible to decrease a calculation period.

As the number of shelves included in each class increases, a hit ratio upon actual picking decreases. Thus, the number of shelves to be included in a class may be limited on the basis of an allowable hit ratio.

Third Embodiment

While in the first embodiment, there is one picking station, the present invention can be also applied to a case where there are a plurality of picking stations. In this case, allocation of orders to the picking stations, and allocation of shelves to the picking stations are uniquely determined in advance. This enables determination of item allocation to the respective shelves by the method in the first embodiment being individually applied to the respective picking stations.

Figure 9:
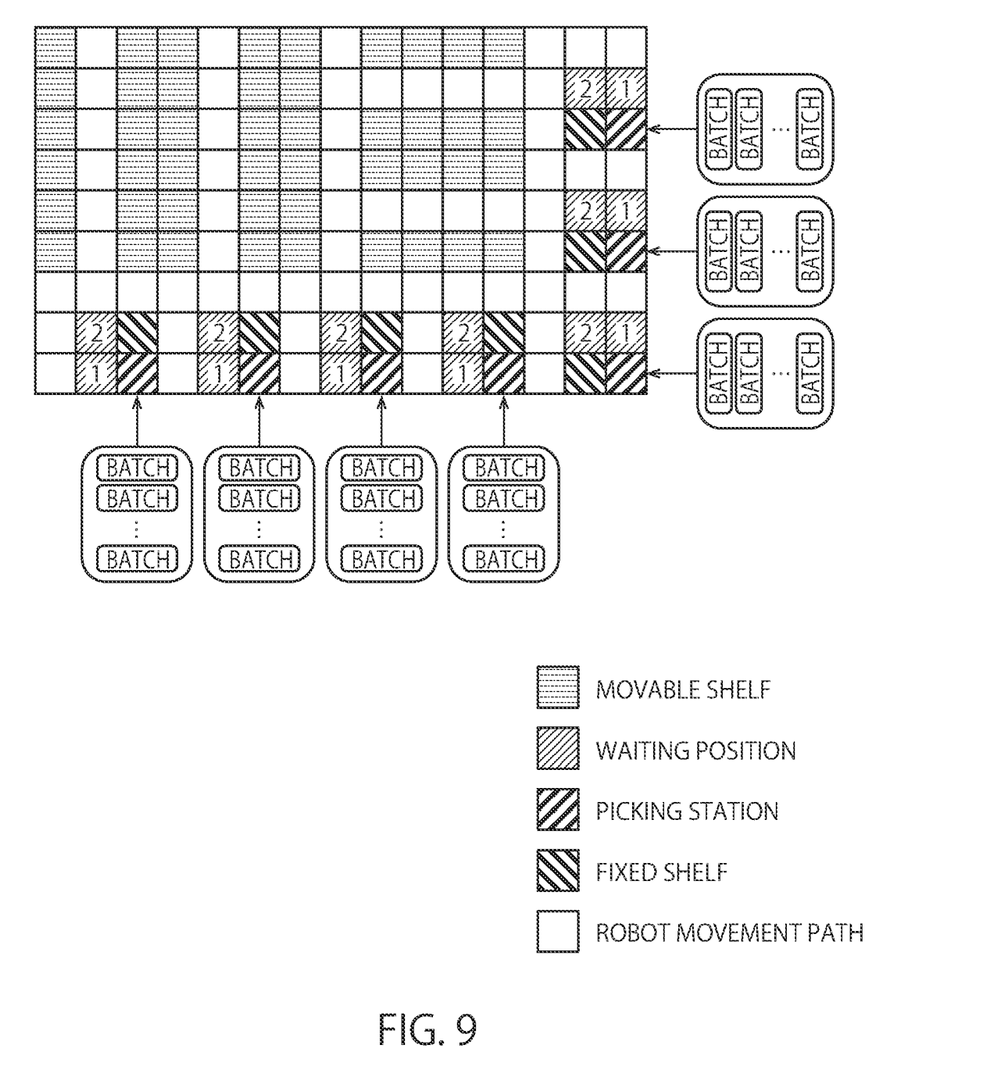
FIG. 9 is a plan view schematically illustrating a shelf movement type warehouse in a third embodiment.

FIG. 9 is a plan view schematically illustrating a shelf movement type warehouse in the third embodiment. Illustration of a conveyance moving device is omitted. Picking stations are provided at seven locations in the warehouse. The waiting positions 1 and 2 are provided at each picking station. The worker can pick up items from a shelf placed at the waiting position 1 and cannot pick up items from a shelf placed at the waiting position 2. If the shelf at the waiting position 1 is conveyed out by the moving device, the shelf at the waiting position 2 is moved to the waiting position 1 by the moving device. A new shelf is conveyed into the waiting position 2. At least one shelf "F" whose position is fixed (fixed shelf) is provided at each picking station. The fixed shelf "F" is a shelf (second shelf) provided at a position where items can be picked up at the picking station, and the worker can pick up items also from the fixed shelf "F".

An aggregate of batches is associated with each picking station. Further, shelves (including the fixed shelf "F") are allocated to the respective picking stations, and the shelves do not overlap among the picking stations. Allocation of items to the respective shelves can be determined in a similar manner to the first embodiment. In formulation of the model, it is only necessary to set cost of the fixed shelf "F" at a predetermined value. The predetermined value is set at, for example, a value higher than a maximum value of the cost of the movable shelves.

Fourth Embodiment

While it has been assumed in the first embodiment that all the shelves are empty, the present invention can be also applied to a case where items have already been put on part or all of the shelves. In this case, to determine items to be put into empty spots at the shelf, it is only necessary to optimize the model by formulating the model in a similar manner to the first embodiment.

At the item information storage 11, it is only necessary to set the number of items which can be additionally put into each compartment as the number of items which can be put into each compartment. It is only necessary to set a total number (maximum value) of items which can be additionally put on the shelf "j" as the total number (maximum value) of items which can be put on the shelf "j". Information on the number of items which have already been put into each compartment may be stored for each item ID. The total number of items which have already been put on the shelf "j" may be stored for each item ID.

In formulation of the model, a value obtained by subtracting the number of items which has already been put on the shelf from a maximum number of items "i" which can be put on the shelf may be set as "$r_i$". "$r_i$" may be defined for each shelf and set as "$r_{i,j}$". Further, a value obtained by subtracting the number of compartments into which items have already been put from the number of compartments of the shelf may be set as the number of frontages "L" of the shelf.

Fifth Embodiment

While items are put in unit of a compartment in the first embodiment, in a case where one item is put into each compartment regardless of a size of the compartment, it is only necessary to regard the number of compartments at the shelf as a maximum number of items which can be put on the shelf. Processing can be performed in a similar manner also in a case where two items, three items, or the like, are put into each compartment.

(Hardware Configuration)

Figure 10:
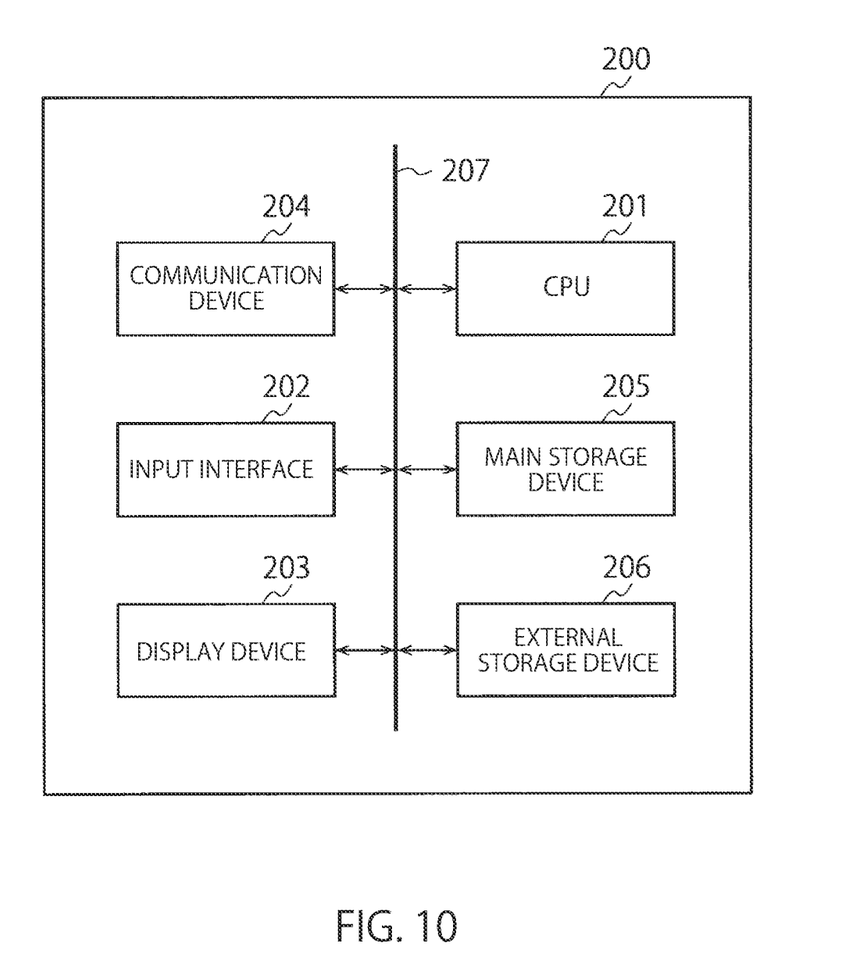
FIG. 10 is a view illustrating a hardware configuration of an information processing device according to embodiments of the present invention.

FIG. 17 illustrates a hardware configuration of the item allocation device 10 according to the embodiment. The item allocation device 10 is configured as a computer device 200. The computer device 200 includes a CPU 201, an input interface 202, a display device 203, a communication device 204, a main storage device 205, and an external storage device 206, and these components are mutually connected through a bus 207.

The CPU (central processing unit) 201 executes an information processing program as a computer program on the main storage device 205. The information processing program is a computer program configured to achieve each above-described functional component of the present device. The information processing program may be achieved by a combination of a plurality of computer programs and scripts instead of one computer program. Each functional component is achieved as the CPU 201 executes the information processing program.

The input interface 202 is a circuit for inputting, to the present device, an operation signal from an input device such as a keyboard, a mouse, or a touch panel. The input interface 202 corresponds to the inputter 105.

The display device 203 displays data output from the present device. The display device 203 is, for example, a liquid crystal display (LCD), an organic electroluminescence display, a cathode-ray tube (CRT), or a plasma display (PDP) but is not limited thereto. Data output from the computer device 200 can be displayed on the display device 203.

The communication device 204 is a circuit for the present device to communicate with an external device in a wireless or wired manner. Data can be input from the external device through the communication device 204. The data input from the external device can be stored in the main storage device 205 or the external storage device 206.

The main storage device 205 stores, for example, the information processing program, data necessary for execution of the information processing program, and data generated through execution of the information processing program. The information processing program is loaded and executed on the main storage device 205. The main storage device 205 is, for example, a RAM, a DRAM, or an SRAM but is not limited thereto. Each storage or database in the information processing device may be implemented on the main storage device 205.

The external storage device 206 stores, for example, the information processing program, data necessary for execution of the information processing program, and data generated through execution of the information processing program. The information processing program and the data are read onto the main storage device 205 at execution of the information processing program. The external storage device 206 is, for example, a hard disk, an optical disk, a flash memory, or a magnetic tape but is not limited thereto. Each storage or database in the information processing device may be implemented on the external storage device 206.

The information processing program may be installed on the computer device 200 in advance or may be stored in a storage medium such as a CD-ROM. Moreover, the information processing program may be uploaded on the Internet.

The present device may be configured as a single computer device 200 or may be configured as a system including a plurality of mutually connected computer devices 200.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing device comprising:
processing circuitry configured to determine items to be put on a plurality of first shelves which are capable of moving to a picking station, on a basis of distances between the plurality of first shelves and the picking station and order information of the items and calculate cost for moving the plurality of first shelves to the picking station,
wherein the processing circuitry determines the items to be put on the plurality of first shelves on a basis of the cost and the order information of the items.

2. An information processing device, comprising:
processing circuitry configured to determine items to be put on a plurality of first shelves which are capable of moving to a picking station, on a basis of distances between the plurality of first shelves and the picking station and order information of the items and calculate, for each of a plurality of aggregates of the order information, a coverage being a ratio of the order information covered by the items to be put on the first shelves among the order information included in the aggregate or a ration of the items covered by the items to be put on the first shelves among the items of the order information in the aggregate,
wherein the processing circuitry determines the items to be put on the plurality of first shelves on a basis of the coverages.

3. The information processing device according to claim 2, wherein in a case where a total number of the items in the aggregate is equal to or larger than a total number of the items to be put on the first shelves, the processing circuitry counts a number of pieces of the order information including the items and calculates a ratio of a sum of count values for each of the items and a total number of pieces of the order information in the aggregate, the calculated ratio being the coverage.

4. The information processing device according to claim 2, wherein the processing circuitry calculates a number of pieces of the order information for which a number of the items of the order information in the aggregate is equal to or larger than a number of the items to be put on the first shelves and sets a ratio of the number of pieces of the order information and a total number of pieces of the order information in the aggregate, the calculated ratio being the coverage.

5. The information processing device according to claim 2, wherein in a case where a number of the items in the aggregate is equal to or larger than a number of the items to be put on the first shelves, the processing circuitry sums the number of the items and calculates a ratio of a total value of the number of the items for each of the items and a number of all items to be put on the first shelves, the calculated ratio being the coverage.

6. The information processing device according to claim 2, wherein the processing circuitry calculates cost for moving the plurality of first shelves to the picking station,
wherein the processing circuitry calculates a minimum value among a plurality of the coverages for the plurality of aggregates for each of the first shelves and determines the items to be put on the plurality of first shelves on a basis of the minimum value of the coverages for each of the first shelves and the cost.

7. The information processing device according to claim 6, wherein the processing circuitry multiplies the minimum value of the coverages by the cost and determines the items to be put on the plurality of first shelves using a sum of multiplication values as an index.

8. The information processing device according to claim 7, wherein the processing circuitry determines the items to be put on the plurality of first shelves by maximizing the index.

9. The information processing device according to claim 1, wherein the cost has a value in accordance with distances between the first shelves and the picking station.

10. The information processing device according to claim 1, wherein the cost has a value in accordance with periods required for moving the first shelves to the picking station.

11. The information processing device according to claim 1, wherein the order information is based on history of order information of the items generated in a past.

12. The information processing device according to claim 1, wherein the order information is based on prediction information of orders of the items to be generated in a future.

13. The information processing device according to claim 2, wherein the processing circuitry divides the plurality of first shelves into a plurality of classes and calculates the coverage for each of the classes.

14. The information processing device according to claim 1,
wherein a plurality of pieces of the order information are allocated to any of a plurality of the picking stations, and the plurality of first shelves are allocated to any of a plurality of the picking stations,
the processing circuitry calculates the cost on a basis of the allocated first shelves and the allocated order information for each of the picking stations, and
the processing circuitry determines items to be put on the allocated first shelves for each of the picking stations.

15. The information processing device according to claim 1, wherein the processing circuitry determines items to be put on at least one second shelf provided at a position where items are able to be picked up at the picking station and the items to be put on the plurality of first shelves.

16. An information processing method comprising:
determining items to be put on a plurality of first shelves which are capable of moving to a picking station, on a basis of distances between the plurality of first shelves and the picking station and order information of the items;

calculating cost for moving the plurality of first shelves to the picking station; and determining the items to be put on the plurality of first shelves on a basis of the cost and the order information of the items.

17. A non-transitory computer readable medium having a computer program stored therein which when the computer program is executed by a computer, causes the computer to perform processes comprising:

determining items to be put on a plurality of first shelves which are capable of moving to a picking station, on a basis of distances between the plurality of first shelves and the picking station and order information of the items;

calculating cost for moving the plurality of first shelves to the picking station; and determining the items to be put on the plurality of first shelves on a basis of the cost and the order information of the items.

18. An information processing system comprising:

at least one moving device configured to cause a plurality of first shelves to move to a picking station; and an information processing device including a processing circuitry configured to determine items to be put on the plurality of first shelves on a basis of distances between the plurality of first shelves and the picking station and order information of the items and calculate cost for moving the plurality of first shelves to the picking station wherein the processing circuitry determines the items to be put on the plurality of first shelves on a basis of the cost and the order information of the items.

19. The information processing system according to claim 18, further comprising a robot configured to pick up the items from the first shelves at the picking station.

20. An information processing method comprising:

determining items to be put on a plurality of first shelves which are capable of moving to a picking station, on a basis of distances between the plurality of first shelves and the picking station and order information of the items; and calculating, for each of a plurality of aggregates of the order information, a coverage being a ratio of the order information covered by the items to be put on the first shelves among the order information included in the aggregate or a ration of the items covered by the items to be put on the first shelves among the items of the order information in the aggregate; and determining the items to be put on the plurality of first shelves on a basis of the coverages.

21. A non-transitory computer readable medium having a computer program stored therein which when the computer program is executed by a computer, causes the computer to perform processes comprising:

determining items to be put on a plurality of first shelves which are capable of moving to a picking station, on a basis of distances between the plurality of first shelves and the picking station and order information of the items; and calculating, for each of a plurality of aggregates of the order information, a coverage being a ratio of the order information covered by the items to be put on the first shelves among the order information included in the aggregate or a ration of the items covered by the items to be put on the first shelves among the items of the order information in the aggregate; and determining the items to be put on the plurality of first shelves on a basis of the coverages.

22. An information processing system comprising:

at least one moving device configured to cause a plurality of first shelves to move to a picking station; and an information processing device including processing circuitry configured to determine items to be put on the plurality of first shelves on a basis of distances between the plurality of first shelves and the picking station and order information of the items and calculate, for each of a plurality of aggregates of the order information, a coverage being a ratio of the order information covered by the items to be put on the first shelves among the order information included in the aggregate or a ration of the items covered by the items to be put on the first shelves among the items of the order information in the aggregate wherein the processing circuitry determines the items to be put on the plurality of first shelves on a basis of the coverages.

* * * * *